United States Patent [19]

Yoshida et al.

[11] Patent Number: 6,129,272

[45] Date of Patent: *Oct. 10, 2000

[54] ELECTRONIC PAYMENT SYSTEM USING CHECK IDENTIFIER AND ISSUE TIME FOR ILLEGAL ACTS DETECTION

[75] Inventors: Hideki Yoshida; Toru Imai, both of Kanagawa-ken, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/135,675

[22] Filed: Aug. 18, 1998

Related U.S. Application Data

[63] Continuation of application No. 08/614,253, Mar. 12, 1996.

[30] Foreign Application Priority Data

Mar. 13, 1995 [JP] Japan .................................. 7-052142

[51] Int. Cl.[7] ........................................................ G06F 17/60
[52] U.S. Cl. ............................ 235/379; 235/380; 235/487
[58] Field of Search .................................. 235/379, 380, 235/382, 384, 487, 492

[56] References Cited

U.S. PATENT DOCUMENTS

| 5,103,079 | 4/1992 | Barakai et al. | 235/380 |
| 5,623,547 | 4/1997 | Jones et al. | 235/379 X |
| 5,936,219 | 8/1999 | Yoshida et al. | 235/379 |

*Primary Examiner*—Michael G Lee
*Attorney, Agent, or Firm*—Foley & Lardner

[57] ABSTRACT

A computer-based electronic payment system, in which a payer's check issuing computer issues an electronic check having a check identifier and an issue time, where the check identifier includes a payer identifier for uniquely identifying a payer and a payment identifier for uniquely identifying a payment. Then, at a payee's check processing computer receiving the electronic check from the payer and at a bank's check processing computer receiving the electronic check transmitted from the payee, a check identifier of each electronic check accepted during a prescribed period of time prior to a current time is recorded, and a received electronic check is refused when the issue time of the received electronic check is older than the prescribed period of time past of the current time or the check identifier of the received electronic check is identical to any recorded check identifier of an already accepted electronic check, or a received electronic check is accepted when the acceptance is not refused.

33 Claims, 7 Drawing Sheets

ELECTRONIC PAYMENT SYSTEM USING CHECK IDENTIFIER AND ISSUE TIME FOR ILLEGAL ACTS DETECTION

This application is a continuation of application Ser. No. 08/614,253, filed Mar. 12, 1996.

BACKGROUND OF THE INVENTION

1. Field of the Invention

The present invention relates to an electronic payment system for realizing payments on computers electronically, which is suitable for a check acceptance system at a store for selling commercial goods in exchange for an electronic check issued by a consumer, or a check acceptance system at a bank for transferring from a consumer's account to a store's account according to an electronic check issued by a consumer.

2. Description of the Background Art

An electronic check system is a conventionally proposed scheme for realizing payments on computers electronically, which is described in Kevin O'Toole: "The Internet Billing Server: Transaction Protocol Alternatives", Carnegie Mellon University Information Networking Institute, Technical Report INI TR 1994-1, April 1994; and B. Clifford Neuman: "Proxy-Based Authorization and Accounting for Distributed Systems", Proceedings of the 13th International Conference on Distributed Computing Systems, May 1993, pp. 283–291, for example.

In the electronic check system, a person responsible for payment (referred hereafter as a consumer) creates a message (referred hereafter as a check) which plays a role of a check on a computer, and sends it to a computer of a person intended to receive the payment (referred hereafter as a store) via a computer network. When the store transmits the received check to a computer of a bank (not necessarily limited to an ordinary bank and including any organization for managing transactions such as a credit card company), the bank transfers a specified amount from the consumer's account to the store's account according to the check, so as to complete the payment.

Besides this electronic check system, there are other schemes for realizing payments on computers electronically such as an on-line transfer system and a prepaid card system, but the electronic check system has the following advantages in comparison with these other schemes.

First, in the on-line transfer system, each sub-system constituting the system is always connected via a network with a host computer at a bank which provides centralized management of the electronic payments, and requests the transfer by notifying a content of payment to the host computer as soon as each payment occurs. For this reason, the on-line transfer system involves a high communication cost, and a heavy processing load on the host computer. As a consequence, a cost required for each transaction is high and it is inconvenient for a payment of a small amount. In contrast, in the electronic check system, it is possible to adopt an off-line scheme in which payments are accumulated to some level and then transmitted to the host computer collectively, so that there is no need for each sub-system constituting the system to be always connected with the host computer. For this reason, a number of communications can be reduced and it is convenient for a payment of a small amount as well. Moreover, each sub-system is operable even under the off-line environment not connected to a network all the times.

On the other hand, in the prepaid card system, the user carries a card recording a balance of an amount deposited in a bank in advance, and each payment is made by subtracting an amount of each payment from the recorded balance at a time of each payment. This prepaid card system has an advantage in that the payment can be made without requiring a connection to the host computer each time, just as in the electronic check system. However, this prepaid card system is associated with a problem in that, when the user's card is tampered by means of hardware to alter the recorded balance illegally, it is difficult to detect a person who committed the illegal act, and this could possibly lead to a failure of the entire system. In addition, this system is not very convenient for the user in that the card will be invalidated when the recorded balance becomes 0 and it requires a connection to the host computer in order to validate the card again. In contrast, in the electronic check system, the user who issued an illegal check can be identified from an identifier of the user attached to each check, so that the illegal user can be detected and a failure of the entire system can be prevented by expelling the detected illegal user from the system.

As should be apparent from the above, the electronic check system is superior in terms of the transaction cost, the off-line performance, and the security, and considered as a prospective candidate for an electronic payment system to be utilized for the commercial transaction on a computer network targeting general consumers, which is attracting much attention recently.

A check used in this electronic check system usually contains a check identifier (ID) for uniquely identifying each check, in addition to an amount of payment. Moreover, it is common to assign the check identifier in a form containing an identifier of the consumer and an identifier of the store, in order to prevent conflicts among identifiers.

A check is provided in a form capable of authenticating that it is created by a particular consumer by means of the digital signature (see Whitfield Diffie and Martin E. Hellman: "New Directions in Cryptography", IEEE Transactions on Information Theory, Vol. IT-22, No. 6, pp. 644–654, November 1976, for example). Consequently, a person other than that particular consumer can read the content of the check by decrypting it, but cannot create a new check as if it is created by that particular consumer in an attempt to receive the payment illegally.

However, in this electronic check system, it is still possible to make an illegal copy of the check, and for this reason, the possibilities for the following two types of illegality cannot be prevented.

First, the store can commit the illegal act called "double charge". This is an illegal act in which the store transmits the check received from the consumer to the bank more than once, so as to obtain an amount greater than an amount to be actually paid by receiving the same payment a number of times.

On the other hand, the consumer can commit the illegal act called "double issue". This is an illegal act in which the consumer issues the same check more than once. Normally, the checks have identifiers which are mutually different from each other, but this identifier is to be assigned by the consumer. Consequently, it is possible for the consumer to issue a check for a certain payment using the same identifier as that already used for another payment, and gives these checks with the identical identifier to the respective stores. This "double issue" by itself may not cause any trouble as long as the bank makes the transfers among the accounts as usual by regarding these checks with the identical identifier as different checks. However, from the bank's point of view, the "double charge" and the "double issue" are indistinguishable. Consequently, the consumer can make the "double issue" and then claim that it is the "double charge" by the store, so as to pay only an amount less than an amount to be actually paid.

In order to prevent this "double issue", it is possible for the store to record the identifiers of all the checks accepted in past and refuse to accept a check issued by a consumer by judging it as the "double issue" when this check uses the same identifier as that already used at that store.

In addition, assuming that the "double issue" is prevented in this manner, it is also possible to prevent the "double charge" similarly. Namely, it is possible for the bank to record the identifiers of all the checks accepted in past and refuse to accept a check transmitted from a store by judging it as the "double charge" when this check uses the same identifier as that already used at that bank (on an assumption that the "double issue" is already prevented and therefore cannot occur).

However, although it is possible to prevent the "double issue" and the "double charge" in this manner in principle, in order to be able to detect the "double issue" and the "double charge" without a failure, it is necessary to preserve records of all the checks used in past. Namely, in order to detect the "double issue" and the "double charge", it is necessary for the store and the bank to preserve an unlimited number of records of the checks, and these records can be enormously voluminous for the store and the bank which have a large number of customers. Therefore, apart from a need for a very large capacity memory device, a processing load required for searching out a particular identifier from this very large capacity memory device would also become appreciable.

SUMMARY OF THE INVENTION

It is therefore an object of the present invention to provide an electronic payment system capable of suppressing a capacity of a memory device required for recording the identifiers of the already used checks and thereby reducing a required search time, while enabling the detection of the illegal copy of the electronic check without a failure.

According to one aspect of the present invention there is provided a computer-based electronic check processing system, comprising: receiving means for receiving an electronic check having a check identifier and an issue time, the check identifier including a payer identifier for uniquely identifying a payer and a payment identifier for uniquely identifying a payment; memory means for recording a check identifier of each electronic check accepted during a prescribed period of time prior to a current time; and acceptance judgement means for refusing an acceptance of a received electronic check when the issue time of the received electronic check is older than the prescribed period of time prior to the current time or the check identifier of the received electronic check is identical to the check identifier of any already accepted electronic check recorded in the memory means, and accepting a received electronic check when the acceptance is not refused.

According to another aspect of the present invention there is provided a method of computer-based electronic check processing, comprising the steps of: receiving an electronic check having a check identifier and an issue time, the check identifier including a payer identifier for uniquely identifying a payer and a payment identifier for uniquely identifying a payment; recording a check identifier of each electronic check accepted during a prescribed period of time prior to a current time; and refusing an acceptance of a received electronic check when the issue time of the received electronic check is older than the prescribed period of time prior to the current time or the check identifier of the received electronic check is identical to the check identifier of any already accepted electronic check recorded by the recording step, and accepting a received electronic check when the acceptance is not refused.

According to another aspect of the present invention there is provided an article of manufacture, comprising: a computer usable medium having computer readable program code means embodied therein for causing a computer to function as an electronic payment processing system for processing an electronic check, the computer readable program means including: first computer readable program code means for causing the computer to receive an electronic check having a check identifier and an issue time, the check identifier including a payer identifier for uniquely identifying a payer and a payment identifier for uniquely identifying a payment; second computer readable program code means for causing the computer to record a check identifier of each electronic check accepted during a prescribed period of time prior to a current time; and third computer readable program code means for causing the computer to refuse an acceptance of a received electronic check when the issue time of the received electronic check is older than the prescribed period of time prior to the current time or the check identifier of the received electronic check is identical to the check identifier of any already accepted electronic check recorded by the second computer readable program code means, and accepting a received electronic check when the acceptance is not refused.

According to another aspect of the present invention there is provided a computer-based electronic payment system, comprising: a payer's check issuing computer for issuing an electronic check having a check identifier and an issue time, the check identifier including a payer identifier for uniquely identifying a payer and a payment identifier for uniquely identifying a payment; a payee's check processing computer for receiving the electronic check from the payer's check issuing computer, recording a check identifier of each electronic check accepted by the payee's check processing computer during a first prescribed period of time prior to a current time, refusing an acceptance of a received electronic check when the issue time of the received electronic check is older than the first prescribed period of time prior to the current time or the check identifier of the received electronic check is identical to any recorded check identifier of an already accepted electronic check, accepting a received electronic check when the acceptance is not refused, and transmitting each accepted electronic check; and a transaction executing computer for receiving the electronic check transmitted from the payee's check processing computer, recording a check identifier of each electronic check accepted by the transaction executing computer during a second prescribed period of time prior to the current time, refusing an acceptance of a transmitted electronic check when the issue time of the transmitted electronic check is older than the second prescribed period of time prior to the current time or the check identifier of the transmitted electronic check is identical to any recorded check identifier of an already accepted electronic check, accepting a received electronic check when the acceptance is not refused, and transferring a specified amount from a specified payer's account to a specified payee's account according to each accepted electronic check.

According to another aspect of the present invention there is provided a method of computer-based electronic payment, comprising the steps of: (a) at a payer's check issuing computer, issuing an electronic check having a check identifier and an issue time, the check identifier including a payer identifier for uniquely identifying a payer and a payment identifier for uniquely identifying a payment; (b) at a payee's check processing computer, receiving the electronic check from the payer's check issuing computer, recording a check identifier of each electronic check accepted by the payee's check processing computer during a first prescribed period of time prior to a current time, refusing an acceptance of a received electronic check when the issue time of the received electronic check is older than the first prescribed period of time prior to the current time or the check identifier of the received electronic check is identical to any recorded check identifier of an already accepted electronic check, accepting a received electronic check when the acceptance is not refused, and transmitting each accepted electronic check; and (c) at a transaction executing computer, receiving the electronic check transmitted from the payee's check processing computer, recording a check identifier of each electronic check accepted by the transaction executing computer during a second prescribed period of time prior to the current time, refusing an acceptance of a transmitted electronic check when the issue time of the transmitted electronic check is older than the second prescribed period of time prior to the current time or the check identifier of the transmitted electronic check is identical to any recorded check identifier of an already accepted electronic check, accepting a received electronic check when the acceptance is not refused, and transferring a specified amount from a specified payer's account to a specified payee's account according to each accepted electronic check.

Other features and advantages of the present invention will become apparent from the following description taken in conjunction with the accompanying drawings.

DETAILED DESCRIPTION OF THE PREFERRED EMBODIMENTS

Figure 1:
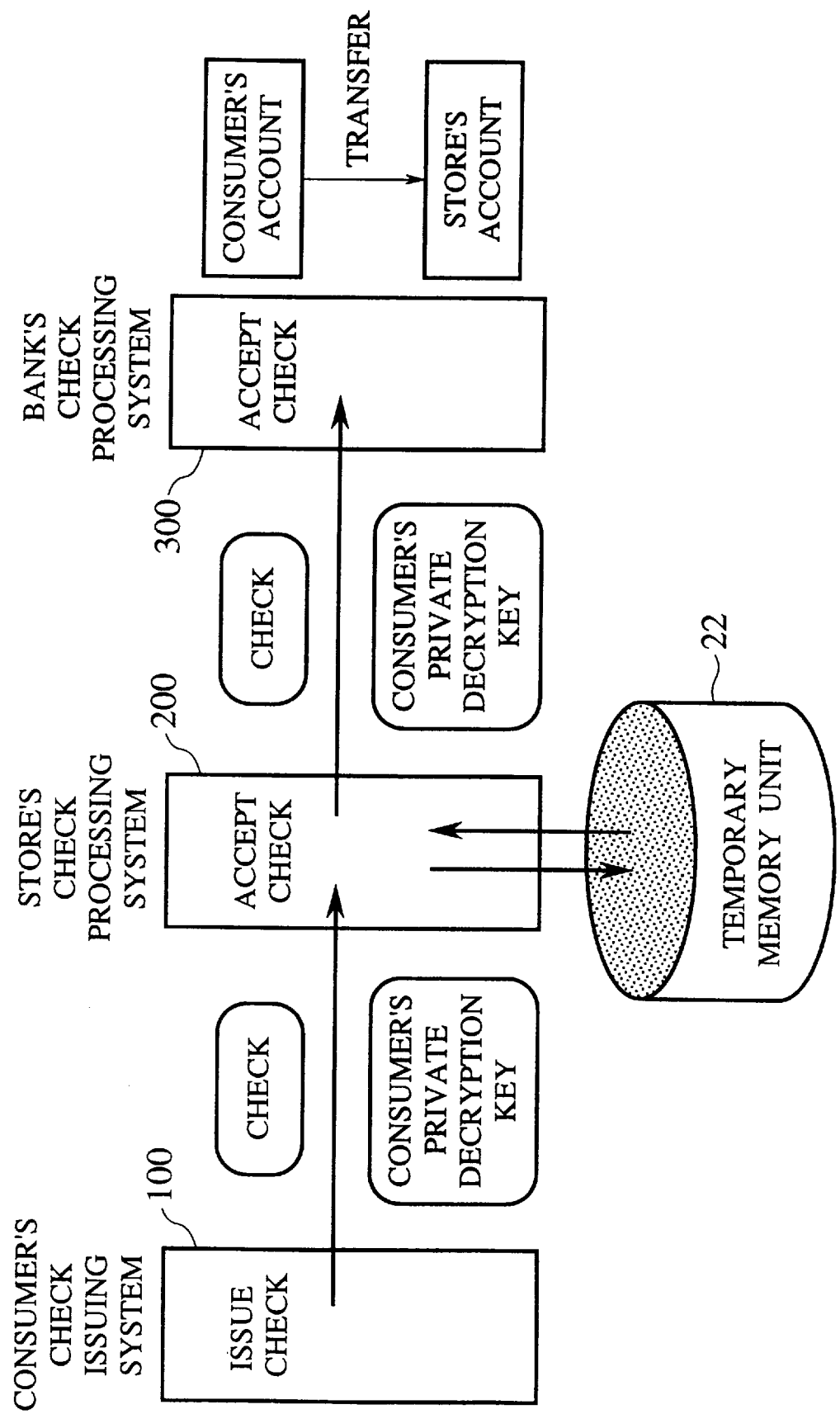
FIG. 1 is a schematic block diagram of an overall configuration of an electronic payment system according to the present invention.

Now, the preferred embodiments of an electronic payment system according to the present invention will be described in detail.

First, the main features of the present invention will be briefly summarized.

In the present invention, the records of information for identifying checks issued during a prescribed period of time up to a current time are recorded at the store and the bank. When a check is received from a consumer or a store, whether this check has already been accepted before or not is judged according to these records. Consequently, it is impossible to perpetrate a "double issue" or "double charge" by giving the same check more than once.

Also, at a time of receiving a check, the issue date and time of the check are examined, and if the issue date and time of the check are older than a prescribed period of time prior to current date and time, the acceptance of this check will be refused by judging it as an expired one. For this reason, the "double issue" or the "double charge" using the old check which is already deleted from the records can also be detected.

In this manner, the "double issue" and the "double charge" can be prevented according to the present invention. Moreover, it is only necessary to keep each record during the above described prescribed period of time, and the records of the checks issued earlier than that can be discarded. For this reason, a capacity of the memory device required for keeping records of the already used checks can be reduced, and therefore a search time required in examining whether each check has already been accepted before or not can be shortened.

Here, the fact that the information concerning the issue date and time of the check is integrally incorporated within the check itself implies that a correspondence between the information concerning the issue date and time and the check itself will be maintained throughout the entire distribution process of the check (from the issuance until the transfer), and that the information concerning the issue date and time cannot be tampered.

More specifically, the issue date and time are included within a main text of the check which also contains an identifier of a consumer, an identification number unique to each payment, and an amount of each payment, and then the issuer of the check (payer) digitally signs the check, so that it is impossible to separate the issue date and time from the check itself to tamper it and pass the tampered check again at any stage in the distribution route of the check. For example, it is possible to examine the issue date and time by decrypting the check even by the store's system, but at a time of passing the check to the bank, the digitally signed check itself is to be passed. Consequently, even if the store tampers the issue date and time of the check and passes the tampered check again, it is impossible for the store to digitally sign the check correctly, so that the illegal act by the store can be detected by the bank.

Now, with references to FIG. 1 to FIG. 4, the first embodiment of an electronic payment system according to the present invention will be described in detail.

The electronic payment system of this embodiment has an overall configuration as shown in FIG. 1, which comprises a consumer's check issuing system 100, a store's check processing system 200, and a bank's check processing system 300, where the check issued by the consumer's check issuing system 100 will be examined by the store's check processing system 200 and the bank's check processing system 300 with regards to its issue date and time, etc. In addition, the store's check processing system 200 has a temporary memory unit 22 for temporarily storing checks before passing them to the bank's check processing system 300.

In the following, each of these sub-systems constituting the electronic payment system of FIG. 1 will be described one by one.

Figure 2:
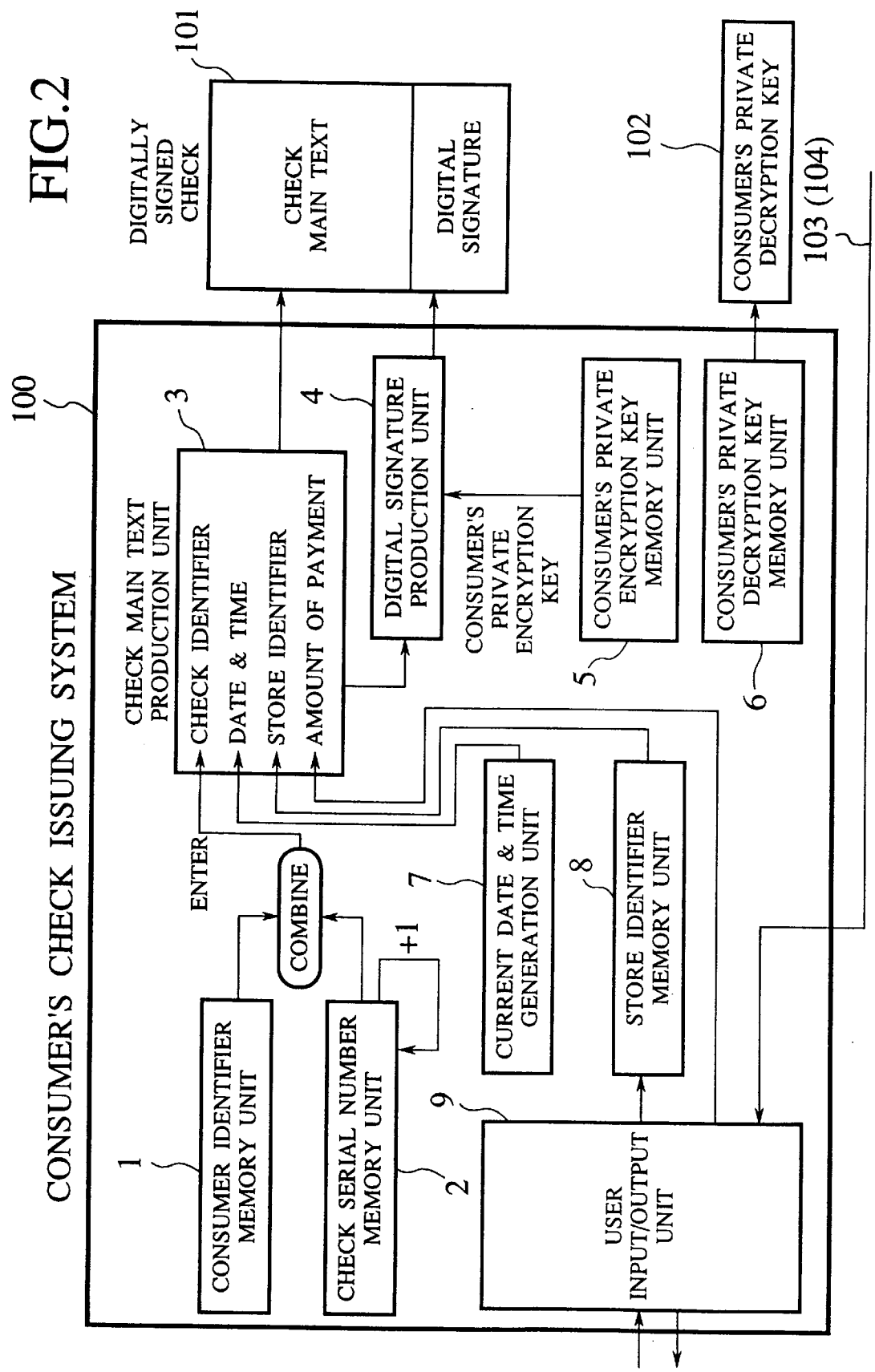
FIG. 2 is a block diagram of a detailed configuration of a consumer's check issuing system in the electronic payment system of FIG. 1 according to the first embodiment.

FIG. 2 shows a detailed configuration of the consumer's check issuing system 100 in the electronic payment system of FIG. 1.

In this consumer's check issuing system 100 of FIG. 2, an identifier formed by combining a consumer's identifier and a check serial number is used as a check identifier. The consumer identifier of a consumer who owns this consumer's check issuing system 100 is stored in a consumer identifier memory unit 1 in advance. A check serial number memory unit 2 stores a previously issued check serial number, and outputs a new check serial number by adding one to the stored serial number every time a new check is to be issued.

By generating the check identifier in this manner, an identifier already used before will not be used again, and it will be impossible for any other consumer to issue a check with the same identifier as that of a check issued by this consumer. These statements may not necessarily be true, however, when this consumer himself commits an illegal act of "double issue" on this consumer's check issuing system 100, In this consumer's check issuing system 100, a check main text production unit 3 produces a check main text containing the consumer identifier, the check serial number, an amount of payment, a store identifier for specifying a receiver of the check, and issue date and time. Then, a digital signature production unit 4 produces a digital signature by using a consumer's private encryption key which is assigned to each consumer in advance and stored in a consumer's private encryption key memory unit 5, and attaches the produced digital signature to the check main text, to form a digitally signed check 101.

Here, the check main text containing the issue date and time is produced by entering current date and time generated by a current date and time generation unit 7. Also, the check main text containing the store identifier is produced by entering an identifier of a store specified by the consumer through a user input/output unit 9 among store identifiers stored in a store identifier memory unit 8. The amount of payment is entered into the check main text according to an amount specified by the consumer through the user input/output unit 9 or an amount specified in advance.

The digitally signed check 101 so produced is then transmitted to the store's check processing system 200 via a communication line or a memory medium.

Also, a consumer's private decryption key 102, which is issued by a key distribution center and digitally signed by a certification authority, and which is necessary in authenticating the check, is stored in a consumer's private decryption key memory unit 6 and transmitted along the digitally signed check 101 to the store's check processing system 200.

Figure 3:
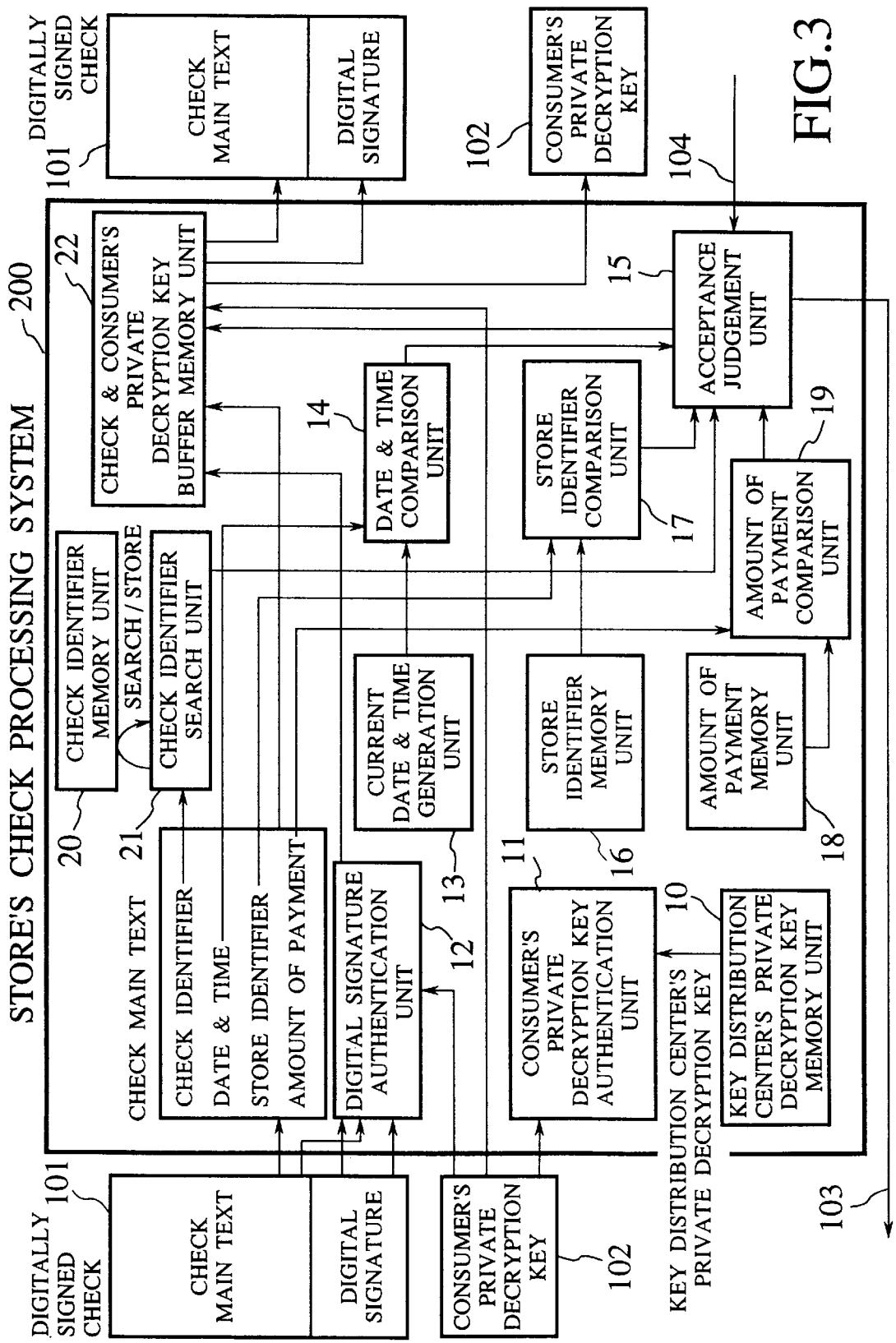
FIG. 3 is a block diagram of a detailed configuration of a store's check processing system in the electronic payment system of FIG. 1 according to the first embodiment.

FIG. 3 shows a detailed configuration of the store's check processing system 200 in the electronic payment system of FIG. 1.

In this store's check processing system 200 of FIG. 3, when the digitally signed check 101 is received from the consumer's check issuing system 100, the consumer's private decryption key 102 received along the digitally signed check 101 is authenticated at a consumer's private decryption key authentication unit 11 using a key distribution center's private decryption key stored in a key distribution center's private decryption key memory unit 10. Then, when the received consumer's private decryption key 102 is verified as a proper consumer's private decryption key distributed by the key distribution center, the digital signature of the digitally signed check 101 is authenticated at a digital signature authentication unit 12 using the received consumer's private decryption key 102.

After these authentications are successfully completed, the issue date and time written in the check main text is taken out, and compared with current date and time obtained from a current date and time generation unit 13 to see if the issue date and time are older than a prescribed period of time prior to the current date and time at a date and time comparison unit 14. If the issue date and time are older, the acceptance of this check is refused by judging it as expired at an acceptance judgement unit 15. A notice 103 (including a notice 104 from the bank's check processing system 300 to be described below) regarding the refusal of the acceptance is then notified to the consumer's check issuing system 100 via a communication line or a memory medium. This notice 103 will be given to the consumer via the user input/output unit 9. When this notice 103 is given, the consumer can issue a new electronic check again according to the procedure described above.

In addition, the store identifier specifying a receiver of the check is taken out from the check main text, and compared with this store's own identifier stored in a store identifier memory unit 16 to see if they coincide at a store identifier comparison unit 17. If they do not coincide, the acceptance of this check is refused at the acceptance judgement unit 15.

In addition, the check identifier is taken out from the check main text, and a check identifier search unit 21 searches for this check identifier in a check identifier memory unit 20 storing the check identifiers of the checks already accepted by the store during the above described prescribed period of time used by the date and time comparison unit 14. If the same check identifier is found in the check identifier memory unit 20, it implies that the check has already been accepted by the store before, so that the acceptance of this check is refused by judging it as the "double issue" at the acceptance judgement unit 15.

In addition, the amount of payment is taken out from the check main text, and compared with an amount of payment to be received by this transaction stored in an amount of payment memory unit 18 to see if they coincide at an amount of payment comparison unit 19. If they do not coincide, the acceptance of this check is refused at the acceptance judgement unit 15.

The check identifier of the accepted check is stored in the check identifier memory unit 20. In this check identifier memory unit 20, the check identifier of the check whose issue date and time are older than the above described prescribed period of time past of the current date and time will be discarded.

When the check is accepted by the acceptance judgement unit 15, the accepted check 101 and the corresponding consumer's private decryption key 102 are temporarily stored in a check and consumer's private decryption key temporary memory unit 22. Then, whenever the store wishes, the check 101 and the consumer's private decryption key 102 in the check and consumer's private decryption key temporary memory unit 22 are transmitted to the bank's check processing system 300. Here, the check 101 and the consumer's private decryption key 102 to be transmitted to the bank's check processing system 300 are those received from the consumer's check issuing system 100 at the store's check processing system 200 as they are.

With this configuration, the store's check processing system 200 can detect an occurrence of the "double issue" by the consumer with respect to the same store.

Figure 4:
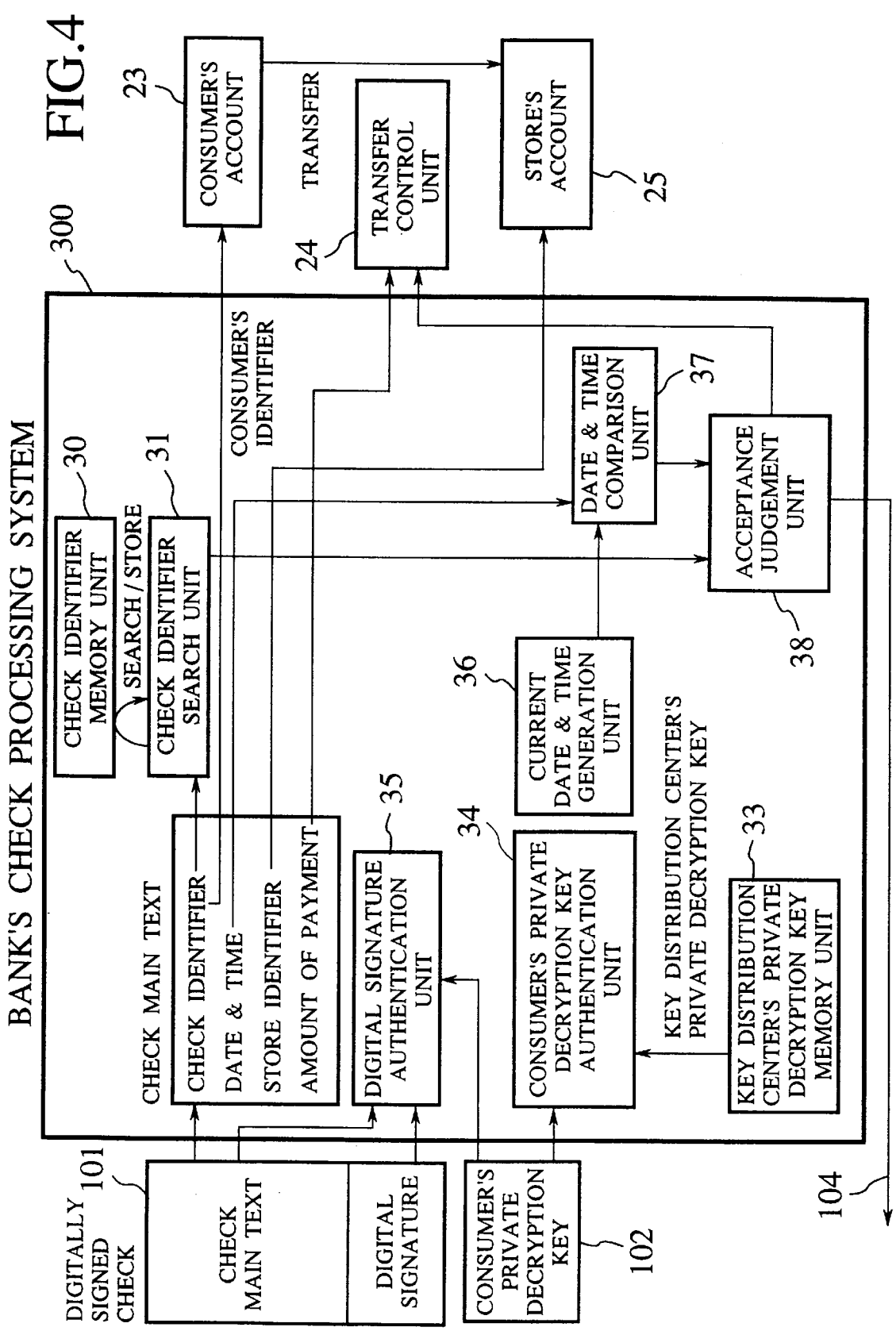
FIG. 4 is a block diagram of a detailed configuration of a bank's check processing system in the electronic payment system of FIG. 1 according to the first embodiment.

FIG. 4 shows a detailed configuration of the bank's check processing system 300 in the electronic payment system of FIG. 1.

In this bank's check processing system 300 of FIG. 4, when the digitally signed check 101 is received from the store's check processing system 200, the consumer's private decryption key 102 received along the digitally signed check 101 is authenticated at a consumer's private decryption key authentication unit 34 using a key distribution center's private decryption key stored in a key distribution center's private decryption key memory unit 33. Then, when the received consumer's private decryption key 102 is verified as a proper consumer's private decryption key distributed by the key distribution center, the digital signature of the digitally signed check 101 is authenticated at a digital signature authentication unit 35 using the received consumer's private decryption key 102.

After these authentications are successfully completed, the issue date and time written in the check main text is taken out, and compared with current date and time obtained from a current date and time generation unit 36 to see if the issue date and time are older than a prescribed period of time prior to the current date and time or not at a date and time comparison unit 37. Here, the prescribed period of time used in this date and time comparison unit 37 may not be the same as that used in the store's check processing system 200 as will be mentioned below. If the issue date and time are older, the acceptance of this check is refused by judging it as an expired one at an acceptance judgement unit 38. A notice 104 regarding the refusal of the acceptance is then notified to the store's check processing system 200 via a communication line or a memory medium. This notice 104 may be notified to the consumer's check issuing system 100 as the notice 103 from the store's check processing system 200 described above, or given directly to the the consumer's check issuing system 100 in parallel to a notification to the store's check processing system 200 from the bank's check processing system 300.

In addition, the check identifier is taken out from the check main text, and a check identifier search unit 31 searches for this check identifier in a check identifier memory unit 30 storing the check identifiers of the checks already accepted by the bank during the above described prescribed period of time used by the date and time comparison unit 37. If the same check identifier is found in the check identifier memory unit 30, it implies that the check has already been accepted by the bank before, so that the acceptance of this check is refused by judging it as the "double issue" or the "double charge" at the acceptance judgement unit 38.

The check identifier of the accepted check is stored in the check identifier memory unit 30. In this check identifier memory unit 30, the check identifier of the check whose issue date and time are older than the above described prescribed period of time prior to the current date and time will be discarded.

Note that the check issued by the consumer arrives at the bank by being temporarily stored in the check and consumer's private decryption key temporary memory unit 22 at the store, and transmitted to the bank only at a timing desired by the store, so that it is rather usual to receive the check at the bank after some time has elapsed since the issue date and time of the check. Consequently, it is preferable to set the prescribed period of time used by the date and time comparison unit 37 and the check identifier memory unit 30 in the bank's check processing system 300 longer than the prescribed period of time used by the date and time comparison unit 14 and the check identifier memory unit 20 in the store's check processing system 200, according to how long it usually takes for the store to transmit the checks to the bank.

When the check is accepted by the acceptance judgement unit 38, a transfer control unit 24 carries out a transfer of the amount of payment specified in the check main text, from an account 23 of the consumer specified by the check identifier contained in the check main text to an account 25 of the store specified by the store identifier contained in the check main text.

With this configuration, it is possible for the bank's check processing system 300 to detect an occurrence of either the "double issue" by the consumer with respect to different stores or the "double charge" by the store.

Consequently, in this electronic payment system, the "double issue" by the consumer with respect to the same store can be detected at the store's check processing system 200, and the "double issue" by the consumer with respect to different stores and the "double charge" by the store can be detected at the bank's check processing system 300, so that the illegal acts of "double issue" and "double charge" can be prevented.

Moreover, it is only necessary to keep each check identifier during a prescribed period of time, and the check identifiers of the checks issued earlier than that can be discarded, so that a capacity of the memory device required for keeping records of the already used checks can be reduced, and therefore a search time required in examining whether each check has already been accepted before or not can be shortened.

Next, with reference to FIG. 5, the second embodiment of an electronic payment system according to the present invention will be described in detail.

In the first embodiment described above, among the "double issue" that can be made by the consumer, the "double issue" with respect to different stores by the consumer cannot be detected at the store's check processing system. Moreover, at the bank's check processing system, an occurrence of either one of the "double issue" by the consumer with respect to different stores and the "double charge" by the store can be detected, but which one of these has occurred cannot be judged.

This second embodiment is directed to a modification of the first embodiment described above, in which it is made possible for the bank's check processing system to judge which one of the "double issue" by the consumer with respect to different stores and the "double charge" by the store has occurred, by recording the entire check main text rather than just the check identifier at the bank's check processing system. Here, the overall configuration of the electronic payment system is substantially similar to that of FIG. 1 except that the bank's check processing system 300 is to be replaced by the bank's check processing system 300A shown in FIG. 5, as follows.

Figure 5:
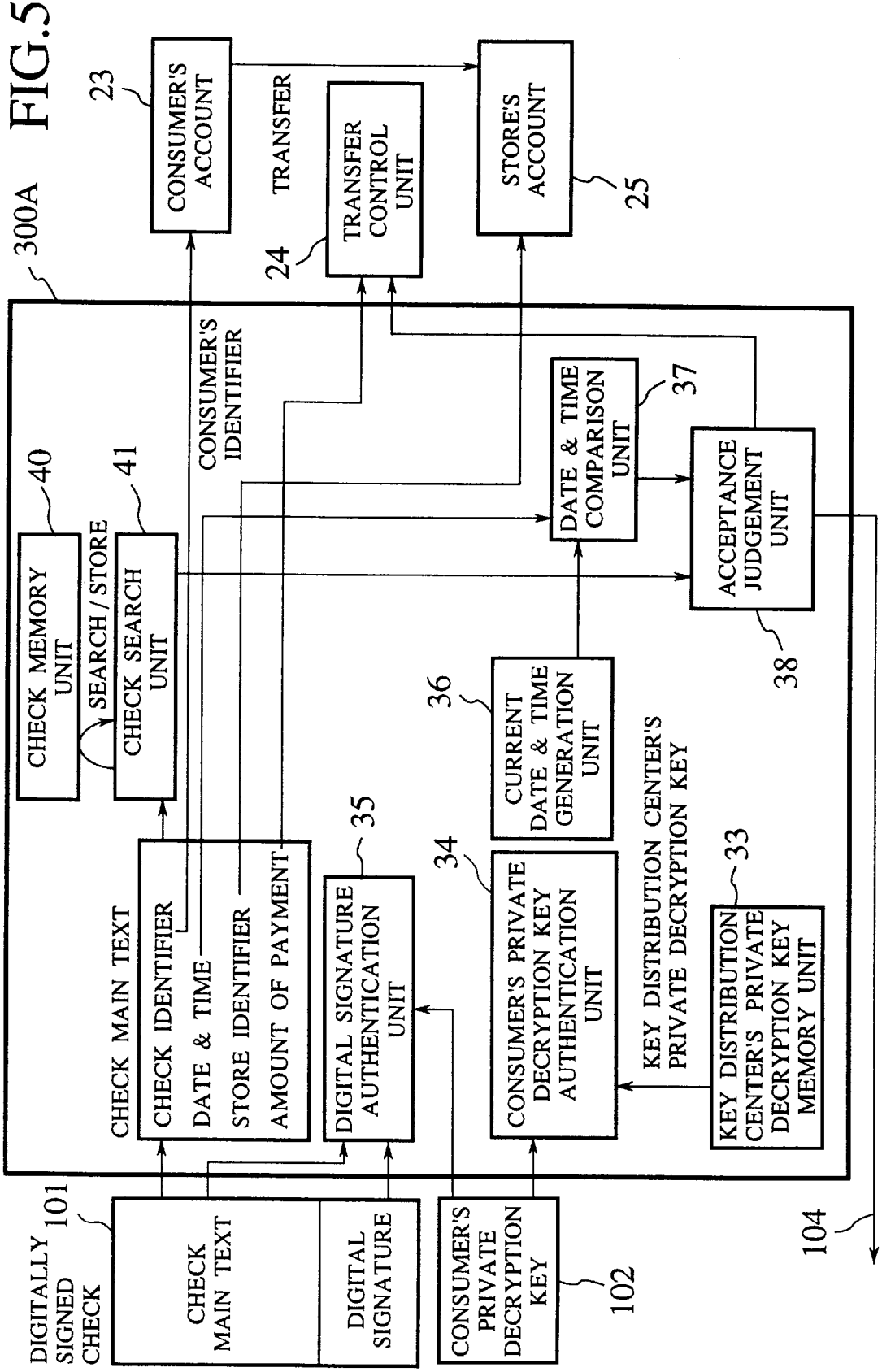
FIG. 5 is a block diagram of a detailed configuration of a bank's check processing system in the electronic payment system of FIG. 1 according to the second embodiment.

FIG. 5 shows a detailed configuration of the bank's check processing system 300A in this second embodiment.

Instead of the check identifier memory unit 30 and the check identifier search unit 31 in the configuration of FIG. 4, this configuration of FIG. 5 has a check memory unit 40 and a check search unit 41, by means of which the entire check main text including the check identifier is stored and searched, respectively. The other elements of this bank's check processing system 300A of FIG. 5 are similar to those of the bank's check processing system 300 of FIG. 4.

The check search unit 41 searches for the check main text of the check which has the same check identifier as that taken out from the check 101 received from the store's check processing system 200, in the check memory unit 40 storing the check main texts of the checks already accepted by the bank during the above described prescribed period of time used by the date and time comparison unit 37.

When the check main text with the identical check identifier is found in the check memory unit 40, the found check main text is compared with the check main text received from the store's check processing system 200, and if they coincide, it can be judged that it is the "double charge" by the store, whereas if they do not coincide, it can be judged that it is the "double issue" with respect to different stores by the consumer.

Thus, with this configuration, it is possible for the bank's check processing system 300A to distinguishably detect the "double issue" by the consumer with respect to different stores and the "double charge" by the store.

Next, with references to FIG. 6 and FIG. 7, the third embodiment of an electronic payment system according to the present invention will be described in detail.

In the second embodiment described above, it is made possible for the bank's check processing system to detect the "double issue" by the consumer with respect to different stores. Instead, this third embodiment is directed to a modification of the first embodiment described above, in which it is made possible for the store's check processing system to detect the "double issue" by the consumer with respect to different stores, by modifying a manner of generating the check identifier. Here, the overall configuration of the electronic payment system is substantially similar to that of FIG. 1 except that the consumer's check issuing system 100 is to be replaced by the consumer's check issuing system 100 shown in FIG. 6, and the store's check processing system 200 is to be replaced by the store's check processing system 200A shown in FIG. 7, as follows.

Figure 6:
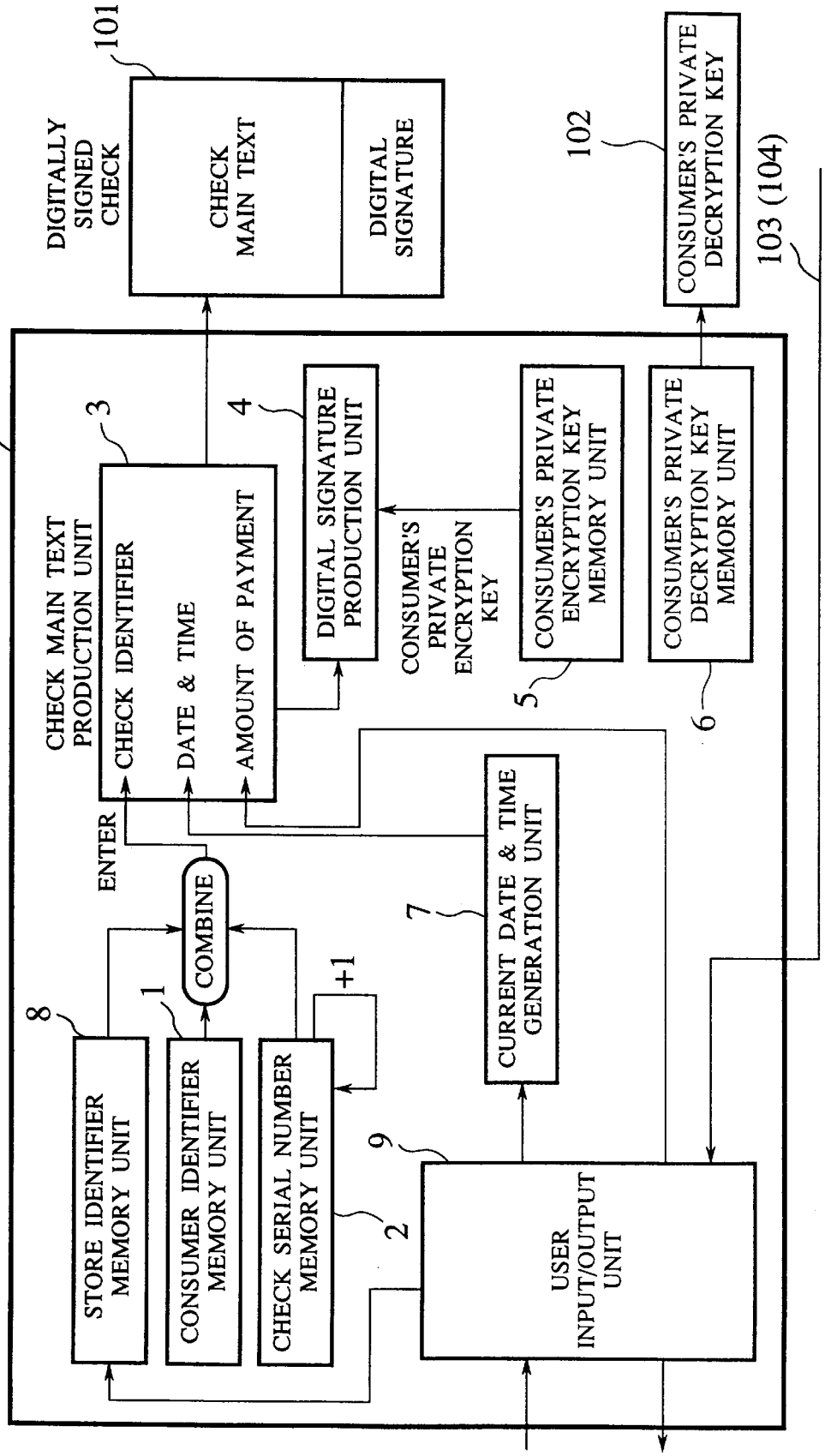
FIG. 6 is a block diagram of a detailed configuration of a consumer's check issuing system in the electronic payment system of FIG . 1 according to the third embodiment.

FIG. 6 shows a detailed configuration of the consumer's check issuing system 100A in this third embodiment.

In this consumer's check issuing system 100A of FIG. 6, the check identifier is generated by further combining the store identifier stored in the store identifier memory unit 8 to a combination of the consumer identifier and the check serial number. In this case, the store identifier is contained in the check identifier, so that there is no need to enter the store identifier itself as an independent item in the check main text. The other elements of this consumer's check issuing system 100A of FIG. 6 are similar to those of the consumer's check issuing system 100 of FIG. 2.

Figure 7:
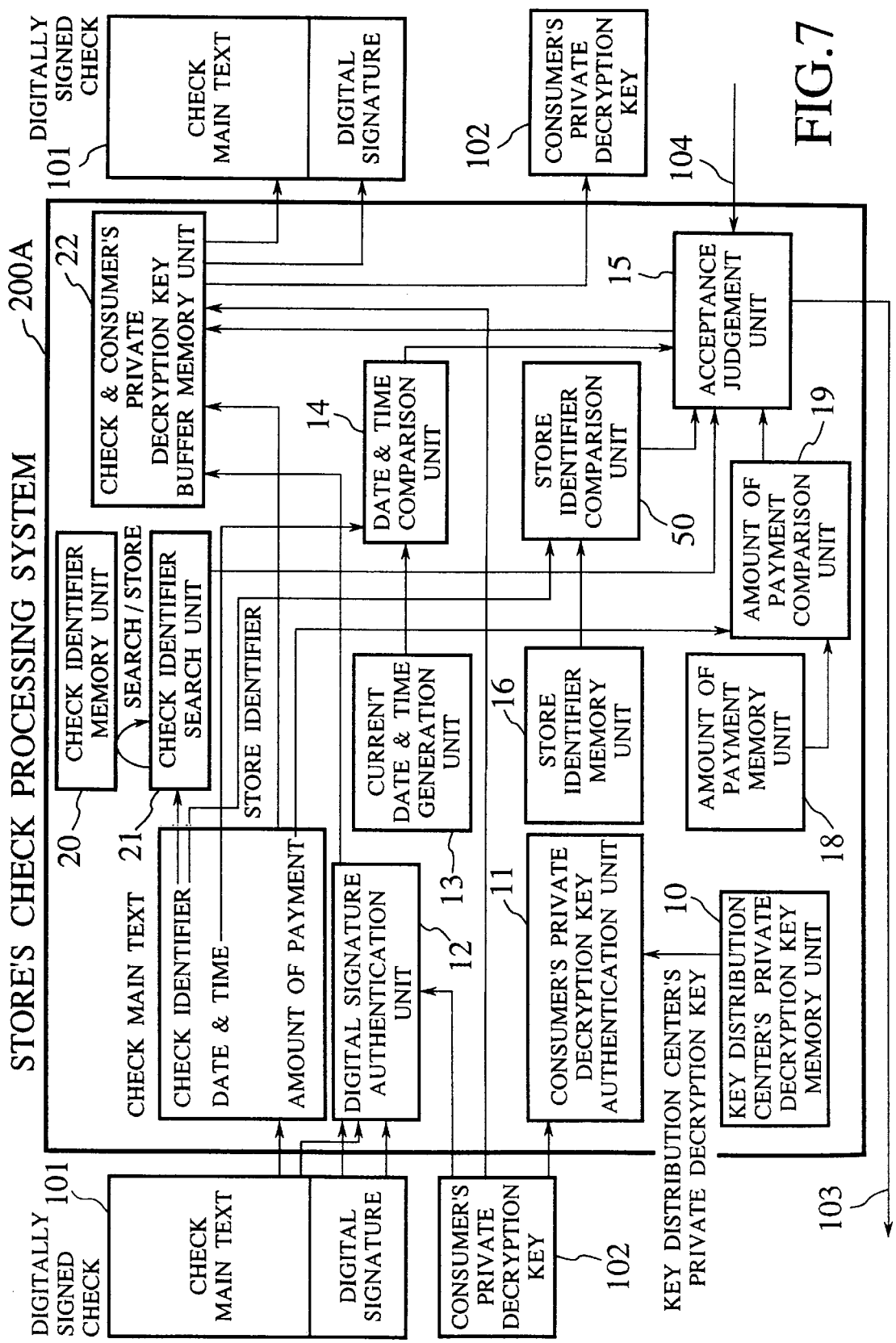
FIG. 7 is a block diagram of a detailed configuration of a store's check processing system in the electronic payment system of FIG. 1 according to the third embodiment.

FIG. 7 shows a detailed configuration of the store's check processing system 200A in this third embodiment.

In this store's check processing system 200A of FIG. 7, there is no independent item for the store identifier in the check main text, so that the store identifier comparison 50 compares the store identifier extracted from the check identifier in the check main text with this store's own identifier stored in the store identifier memory unit 16. The other elements of this store's check processing system 200A of FIG. 7 are similar to those of the store's check processing system 200 of FIG. 3.

With these configurations, when the consumer attempts to issue the identical checks to different stores, at least one of these identical checks is going to have the store identifier different from that of the store which received it, so that the "double issue" by the user will be immediately detected at the store which received one of the identical checks, and the acceptance of the check will be refused. Note that this third embodiment is characterized by issuing the check by including the store identifier in addition to the consumer identifier and the check serial number. In this manner, it becomes practically impossible for the consumer to issue the identical checks to different stores, because the checks issued to different stores require different store identifiers, and the different store identifiers imply different check identifiers in this case.

As described according to the present invention, the "double issue" by the consumer and the "double charge" by the store can be detected at the store or the bank without a failure, so that it is possible to prevent the illegal acts such as "double issue" and "double charge" in the electronic payment system.

Moreover, it is only necessary to store and search the records of the checks issued during a prescribed period of time prior of the current date and time, and there is no need to store and search an unlimited amount of records of the checks, so that there is no need to require an enormous cost for the storing and searching of the records of the checks, and it becomes possible to realize a safe electronic payment system at a lower cost.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

For example, the functions of each one of the consumer's check processing system of FIG. 2 or FIG. 6, the store's check processing system of FIG. 3 or FIG. 7, and the bank's check processing system of FIG. 4 or FIG. 5 can be implemented as a separate computer program for controlling the general purpose digital computer to realize the respective functions as described above. Such a computer program can be implemented as a software package to be installed on a general purpose digital computer in practice.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A computer-based electronic check processing system for a transaction executing party that receives and processes electronic checks transmitted from payees of the electronic checks, the system comprising:

receiving means for receiving an electronic check having a check identifier and an issue time, the check identifier including a payer identifier for uniquely identifying a payer and a payment identifier for uniquely identifying a payment;

memory means for recording a check main text including a check identifier of each electronic check accepted during a prescribed period of time prior to a current time and a payee identifier associated with the check; and acceptance judgement means for refusing an acceptance of a received electronic check when the issue time of the received electronic check is older than the prescribed period of time prior to the current time or if the check identifier of the received electronic check is identical to the check identifier of any already accepted electronic check recorded in the memory means, for judging the received electronic check as a double issue check by a payer with respect to different payees when the check identifier of the received electronic check is identical to the check identifier of an already accepted electronic check recorded in the memory means and the check main text of the received electronic check is not identical to the check main text of the already accepted electronic check recorded in the memory means, and for accepting a received electronic check when the acceptance is not refused.

2. The system of claim 1, further comprising transfer means for transferring a specified amount from a specified payer's account to a specified payee's account in accordance with each electronic check accepted by the acceptance judgement means.

3. The system of claim 1, wherein the acceptance judgement means judges a received electronic check as a double issue check by a payer or a double charge check by a payee when the check identifier of the received electronic check is identical to the check identifier of an already accepted electronic check recorded in the memory means.

4. The system of claim 1, wherein the memory means records a check main text of each already accepted electronic check including the check identifier of each already accepted electronic check.

5. The system of claim 1, wherein the acceptance judgement means judges a received electronic check as a double charge check by a payee when the check identifier of the received electronic check is identical to the check identifier of an already accepted electronic check recorded in the memory means and the check main text of the received electronic check is also identical to the check main text of the already accepted electronic check recorded in the memory means.

6. The system of claim 1, wherein the receiving means receives each electronic check having the check identifier which also includes a payee identifier for uniquely identifying a payee.

7. The system of claim 1, wherein the issue time indicates at least a date on which the electronic check is issued.

8. A method of computer-based electronic check processing for a transaction executing party that receives and processes electronic checks transmitted from payees of the electronic checks, the method comprising the steps of:

receiving an electronic check having a check identifier and an issue time, the check identifier including a payer identifier for uniquely identifying a payer and a payment identifier for uniquely identifying a payment;

recording a check main text including a check identifier of each electronic check accepted during a prescribed period of time prior to a current time and a payee identifier associated with the check;

refusing an acceptance of a received electronic check when the issue time of the received electronic check is older than the prescribed period of time prior to the current time or if the check identifier of the received electronic check is identical to the check identifier of any already accepted electronic check recorded by the recording step, judging the received electronic check as a double issue check by a payer with respect to different payees when the check identifier of the received electronic check is identical to the check identifier of an already accepted electronic check recorded by the recording step and the check main text of the received electronic check is not identical to the check main text of the already accepted electronic check recorded by the recording step, and accepting a received electronic check when the acceptance is not refused.

9. The method of claim 8, further comprising the step of transferring a specified amount from a specified payer's account to a specified payee's account in accordance with each electronic check accepted by the accepting step.

10. The method of claim 8, wherein the accepting step judges a received electronic check as a double issue check by a payer or a double charge check by a payee when the check identifier of the received electronic check is identical to the check identifier of an already accepted electronic check recorded by the recording step.

11. The method of claim 8, wherein the recording step records a check main text of each already accepted electronic check including the check identifier of each already accepted electronic check.

12. The method of claim 8, wherein the accepting step judges a received electronic check as a double charge check by a payee when the check identifier of the received electronic check is identical to the check identifier of an already accepted electronic check recorded by the recording step and the check main text of the received electronic check is also identical to the check main text of the already accepted electronic check recorded by the recording step.

13. The method of claim 8, wherein the receiving step receives each electronic check having the check identifier which also includes a payee identifier for uniquely identifying a payee.

14. The method of claim 8, wherein the issue time indicates at least a date on which the electronic check is issued.

15. An article of manufacture comprising a computer usable medium having computer readable program code means embodied therein for causing a computer to function as an electronic payment processing system for a transaction executing party that receives and processes electronic checks transmitted from payees of the electronic checks, the computer readable program code means including:

first computer readable program code means for causing the computer to receive an electronic check having a check identifier and an issue time, the check identifier including a payer identifier for uniquely identifying a payer and a payment identifier for uniquely identifying a payment;

second computer readable program code means for causing the computer to record a check main text including a check identifier of each electronic check accepted during a prescribed period of time prior to a current time and a payee identifier associated with the check; and third computer readable program code means for causing the computer to refuse an acceptance of a received electronic check when the issue time of the received electronic check is older than the prescribed period of time prior to the current time or if the check identifier of the received electronic check is identical to the check identifier of any already accepted electronic check recorded by the second computer readable program code means, judge the received electronic check as a double issue check by a payer with respect to different payees when the check identifier of the received electronic check is identical to the check identifier of an already accepted electronic check recorded by the second computer readable program code means and the check main text of the received electronic check is not identical to the check main text of the already accepted electronic check recorded by the second computer readable program code means, and accept a received electronic check when the acceptance is not refused.

16. The article of manufacture of claim 15, further comprising additional computer readable program code means for causing the computer to transfer a specified amount from a specified payer's account to a specified payee's account in accordance with each electronic check accepted by the third computer readable program code means.

17. The article of manufacture of claim 15, wherein the third computer readable program code means judges a received electronic check as a double issue check by a payer or a double charge check by a payee when the check identifier of the received electronic check is identical to the check identifier of an already accepted electronic check recorded by the second computer readable program code means.

18. The article of manufacture of claim 15, wherein the second computer readable program code means records a check main text of each already accepted electronic check including the check identifier of each already accepted electronic check.

19. The article of manufacture of claim 15, wherein the third computer readable program code means judges a received electronic check as a double charge check by a payee when the check identifier of the received electronic check is identical to the check identifier of an already accepted electronic check recorded by the second computer readable program code means and the check main text of the received electronic check is also identical to the check main text of the already accepted electronic check recorded by the second computer readable program code means.

20. The article of manufacture of claim 15, wherein the first computer readable program code means receives each electronic check having the check identifier which also includes a payee identifier for uniquely identifying a payee.

21. The article of manufacture of claim 15, wherein the issue time indicates at least a date on which the electronic check is issued.

22. A computer-based electronic check processing system for a payee who receives and processes electronic checks from payers of the electronic checks, the system comprising:
receiving means for receiving an electronic check having a check identifier and an issue time, the check identifier including a payee identifier for uniquely identifying a payee, a payer identifier for uniquely identifying a payer and a payment identifier for uniquely identifying a payment;
memory means for recording a check identifier of each electronic check accepted during a prescribed period of time prior to a current time; and
acceptance judgement means for refusing an acceptance of a received electronic check when the issue time of the received electronic check is older than the prescribed period of time prior to the current time or if the check identifier of the received electronic check is identical to the check identifier of any already accepted electronic check recorded in the memory means, for judging the received electronic check as a double issue check by a payer with respect to different payees when the payee identifier specified by the check identifier of the received electronic check does not coincide with a required payee identifier given to the system in advance, and for accepting a received electronic check when the acceptance is not refused.

23. The system of claim 22, further comprising transmission means for transmitting each electronic check accepted by the acceptance judgement means to another electronic check processing system for further processing the electronic check.

24. The system of claim 22, wherein the acceptance judgement means also refuses an acceptance of a received electronic check when an amount of payment specified by the received electronic check does not coincide with a required amount of payment given to the system in advance.

25. The system of claim 22, wherein the issue time indicates at least a date on which the electronic check is issued.

26. A method of computer-based electronic check processing for a payee who receives and processes electronic checks from payers of the electronic checks, the method comprising the steps of:
receiving an electronic check having a check identifier and an issue time, the check identifier including a payee identifier for uniquely identifying a payee, a payer identifier for uniquely identifying a payer and a payment identifier for uniquely identifying a payment;
recording a check identifier of each electronic check accepted during a prescribed period of time prior to a current time;
refusing an acceptance of a received electronic check when the issue time of the received electronic check is older than the prescribed period of time prior to the current time or if the check identifier of the received electronic check is identical to the check identifier of any already accepted electronic check recorded by the recording step, judging the received electronic check as a double issue check by a payer with respect to different payees when the payee identifier specified by the check identifier of the received electronic check does not coincide with a required payee identifier given to the system in advance, and accepting a received electronic check when the acceptance is not refused.

27. The method of claim 26, further comprising the step of transmitting each electronic check accepted by the accepting step to another electronic check processing system for further processing the electronic check.

28. The method of claim 26, wherein the accepting step also refuses an acceptance of a received electronic check when an amount of payment specified by the received electronic check does not coincide with a required amount of payment given in advance.

29. The method of claim 26, wherein the issue time indicates at least a date on which the electronic check is issued.

30. An article of manufacture, comprising:
a computer usable medium having computer readable program code means embodied therein for causing a computer to function as an electronic payment processing system for a payee who receives and processes electronic checks from payers of the electronic checks, the computer readable program code means including:
first computer readable program code means for causing the computer to receive an electronic check having a check identifier and an issue time, the check identifier including a payee identifier for uniquely identifying a payee, a payer identifier for uniquely identifying a payer and a payment identifier for uniquely identifying a payment;

second computer readable program code means for causing the computer to record a check identifier of each electronic check accepted during a prescribed period of time prior to a current time; and third computer readable program code means for causing the computer to refuse an acceptance of a received electronic check when the issue time of the received electronic check is older than the prescribed period of time prior to the current time or if the check identifier of the received electronic check is identical to the check identifier of any already accepted electronic check recorded by the second computer readable program code means, judge the received electronic check as a double issue check by a payer with respect to different payees when the payee identifier specified by the check identifier of the received electronic check does not coincide with a required payee identifier given to the system in advance, and accept a received electronic check when the acceptance is not refused.

31. The article of manufacture of claim 30, further comprising additional computer readable program code means for causing the computer to transmit each electronic check accepted by the third computer readable program code means to another electronic check processing system for further processing the electronic check.

32. The article of manufacture of claim 30, wherein the third computer readable program code means also refuses an acceptance of a received electronic check when an amount of payment specified by the received electronic check does not coincide with a required amount of payment given in advance.

33. The article of manufacture of claim 30, wherein the issue time indicates at least a date on which the electronic check is issued.

* * * * *